July 11, 1933.    A. J. WHITCOMB ET AL    1,917,478
COMBINED CHARGING AND INDICATING SYSTEM
Filed March 7, 1929    2 Sheets-Sheet 2

Inventors:
Arthur J. Whitcomb,
Owen R. Rice,
Olaf C. Callow,

Patented July 11, 1933

1,917,478

UNITED STATES PATENT OFFICE

ARTHUR J. WHITCOMB, OWEN R. RICE, AND OLAF C. CALLOW, OF CHICAGO, ILLINOIS, ASSIGNORS TO FREYN ENGINEERING COMPANY, OF CHICAGO, ILLINOIS, A CORPORATION OF MAINE

COMBINED CHARGING AND INDICATING SYSTEM

Application filed March 7, 1929. Serial No. 345,163.

The present invention relates to combined charging and indicating systems.

More particularly the present invention relates to subject matter similar in many respects to that disclosed in the application for United States Letters Patent filed September 3, 1927, by Arthur J. Whitcomb, one of the present applicants, which application bears Serial No. 217,448. The present invention embodies certain changes in the structure disclosed in said application which changes result in simplification and in additional functions, which will be referred to presently.

The present invention contemplates means for providing a continuous indication of the level of a charge within a blast furnace or the like and has for one of its objects the provision of means for accomplishing this purpose which is well adapted to meet the needs of commercial service.

A further object is to provide an improved stock line recorder having means cooperating with the charging bells ordinarily provided in blast furnaces, which stock line recorder will give a continuous indication of the level of the charge within a blast furnace except for brief intervals necessary for discharging material from the large charging bell into said blast furnace.

A further object is to provide a level indicator for a blast furnace, which level indicator includes a weighted test member having a cable attached thereto for operating said test member and which level indicator has the advantage that said cable will be maintained taut under all conditions and will be operative to indicate changes of level of the material within said blast furnace for a materially greater part of the time than has been possible with prior installations.

A further object is to provide means for continuously indicating the level of the charge within a blast furnace, which means cooperates with the charging bells ordinarily provided for a blast furnace, to the end that said indicating means will continually indicate rise and fall of the charge within said blast furnace, and which, through cooperation with said charging bell mechanism, will be protected against damage from material being deposited in said blast furnace.

A further object is to provide a simplified system of stock line recording in a blast furnace having the usual large and small charging bells, or their equivalents, in which an operator, by simple manipulation of a switch and control means for the small bell, will set in operation means for automatically hoisting the try rod from operative position, automatically opening and closing the large bell, and causing the try rod to descend to operative position.

A further object is to provide an improved blast furnace charging and stock line recording system which will minimize the number of attendances required in service.

A further object is to provide an improved system of blast furnace operation in which an operator, by the operation of a simple instrumentality, may cause the dumping and subsequent closing of the small bell, which dumping will be followed automatically by the lifting of the try rod within said blast furnace, the opening and closing of the large bell, and the dropping in a safe manner of said try rod to operative position.

A further object is to provide an improved blast furnace charging and stock line recording system which will materially economize the time of the operator or operators in charge of said blast furnace.

A further object is to provide in a blast furnace having the small and large bells, or equivalent, ordinarily used, mechanism including a try rod for continuously measuring the level of charge in said furnace in combination with interlocking means which will prevent the operation of the large bell until the small bell has closed, which will insure the withdrawal of the try rod from the charge within said blast furnace just prior to the opening of the large bell and which will allow said try rod to descend in a safe manner after the large bell has opened to permit the discharge of material thereon into said furnace.

Further objects will appear as the description proceeds.

Referring to the drawings—

Figure 1:
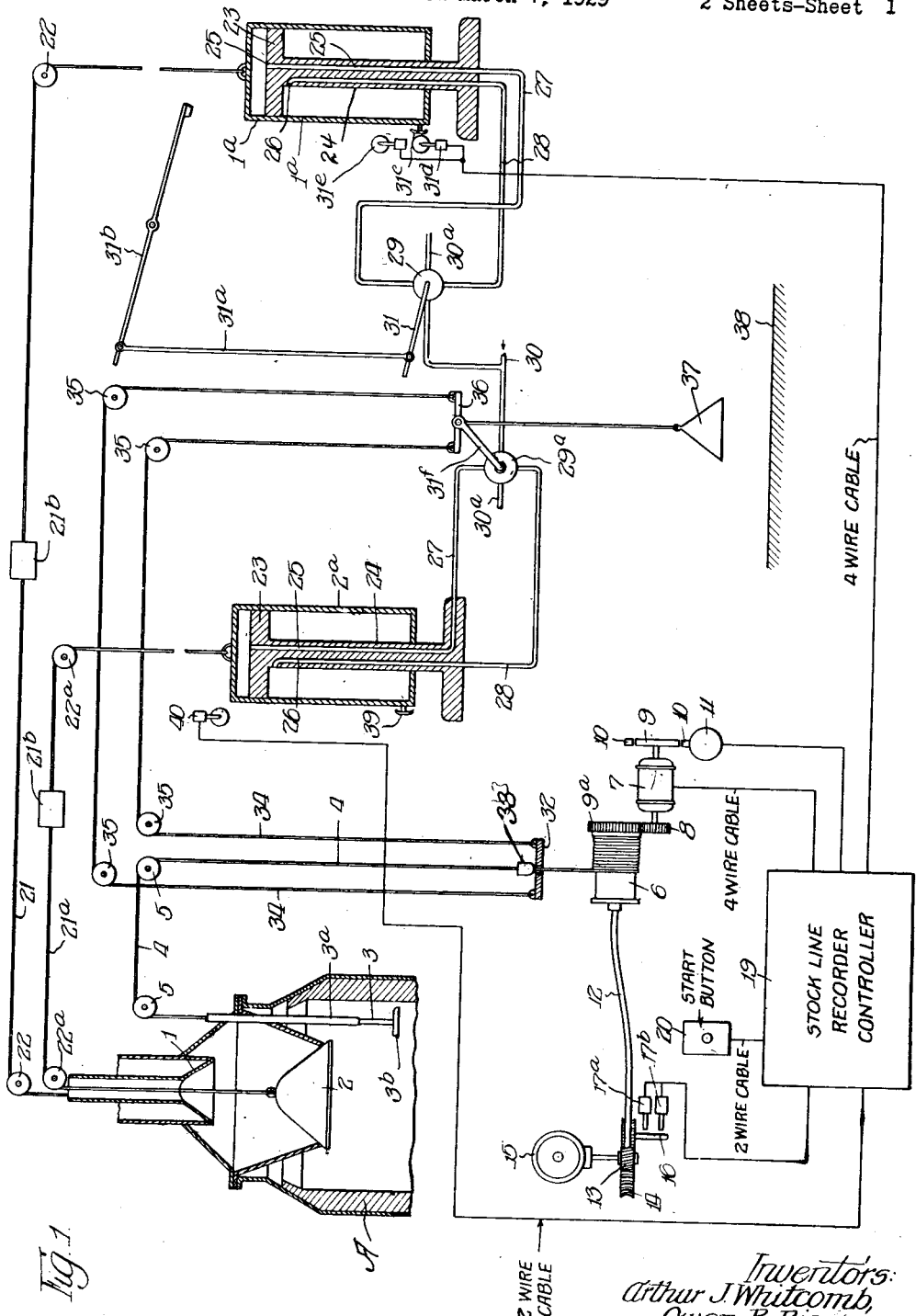
Figure 1 is a diagrammatic view illustrating one embodiment of the present invention.

A detailed explanation of the present invention may be prefaced by a short statement of the functions of the apparatus above referred to.

The present invention contemplates the use of a weighted test or try rod which may have a movement of reciprocation in a vertical direction within a blast furnace or other receptacle. A plurality of test rods may be provided, but only one test rod and the control means therefor have been illustrated in the drawings, inasmuch as the illustration of one test rod and its control means will be sufficient in explaining the invention. Said test rod is preferably held in a vertical position at all times, and may be lifted by means of a flexible connector or cable, which in turn is controlled by a winding drum or equivalent means. Said winding drum or equivalent means is driven through suitable gear reductions or other power transmitting means from an electric motor, which may be shunt or compound wound. The shaft of said motor may be provided with a brake wheel, which may be controlled by brake means biased to braking position. Electrical control means may be provided for releasing said brake. A recording meter may be provided driven from the shaft of said winding drum, said meter being operated by any well known means to produce the result that the amount of deflection of the stylus of said meter is proportional to the amount of rotation of the winding drum. Means are contemplated for opening a limit switch after a predetermined rotation of said winding drum. A typical cycle of operation may be stated as follows: Operation of a start button or equivalent means connects the driving motor of said winding drum to a source of electric current, a relatively large amount of resistance being provided in series with the motor. The brake above referred to is released by this same operation. The motor is connected across the source of electric current in such a way that said motor develops torque tending to cause the winding drum to hoist the test rod. However, the resistance in series with said motor is of such value that insufficient current is applied to said motor to develop a torque of sufficient value to cause the winding drum to hoist, so that the net result is that the test rod descends and causes the winding drum to overcome the opposing torque of the motor. The test rod descends until it rests upon the charge, and the motor continues to develop a torque tending to raise the test rod, the result being that the cable connecting the test rod to the winding drum is kept taut. Should the charge in the blast furnace rise at any time, the test rod will be raised, and automatically the winding drum will take up the slack in the cable. Should the charge fall, the test rod will descend, causing the cable to be unreeled from the winding drum. Consequently, for each change of level of the charge within the blast furnace, corresponding movements are given to the winding drum, which produces a deflection of the stylus of the recording meter in proportion to the amount of rotation of the winding drum.

Means are provided connecting the control means of the large and small charging bells of the blast furnace with the operating means for the test rod, whereby when an operator operates a switch, valve, or equivalent means, to dump the small bell for the last charge of a charging round, he can inaugurate a cycle of operation which, after the closing of the small bell, will cause automatically the lifting of the test rod from its operative position on the charge, the opening of the large bell, the dropping of the test rod in a safe manner, and the closing of the large bell, thereby cutting delays due to necessity (as encountered in prior system) for the operator to wait until the small bell has been closed before operating the mechanism for opening the large bell. The scale car operator is thus enabled to perform not only his usual duties, but the duties of the skip car operator as well.

It may be explained that according to blast furnace practice one or more dumps of the small bell are had before the large bell is dumped. In the practice of the present invention, when the operator has operated the switch, valve, or equivalent means, for causing the last dump from the small bell prior to dumping the large bell, he can simultaneously therewith operate another switch, or equivalent means, to inaugurate the cycle above referred to, and may go at once about other duties, as for example going for another load of materials; or, said operator may operate said switch, or equivalent means, at any time after the next to last closing of the small bell in any round up to practically the end of the last closing movement of said small bell in said round.

Referring first to the cycle of operation of the small bell, it may be stated briefly that after the operator has operated the switch, valve, or equivalent means, for causing dumping of the small bell, means connected with the operating means of said small bell will, after said small bell has opened fully, automatically cause the closing of said small bell.

Assuming that a particular dumping of the small bell is to be followed by a dump of the large bell, and assuming that the operator has operated the switch or equivalent means for that purpose, the following procedure occurs after the small bell has closed. The operation of said switch or equivalent means inaugurates the operation of instrumentalities short-circuiting the resistance in series with the motor connected to the winding drum. This permits the motor to obtain more current, causing the motor to develop sufficient torque to cause the winding drum to raise the test rod to the top of the furnace. When the test rod reaches the top of the furnace, a limit switch is operated, causing the operation of certain instrumentalities, to be referred to hereinafter, to disconnect the motor from the line and causing the brake to set, with the result that the test rod is held at the top of the furnace. As said test rod approaches the limit of its movement in an upward direction, certain instrumentalities are operated to cause the opening of the large bell of the blast furnace, permitting material upon said bell to be discharged into the furnace without danger that said material will injure or bury said test rod. When the large bell has completed its opening movement, instrumentalities are automatically operated to cause the descent of the test rod. When, or shortly after, said test rod has started its descent, instrumentalities are automatically operated to close said large bell.

Referring more particularly to the drawings, a blast furnace A is indicated having the small charging bell 1 and the large charging bell 2, which bells may be of any usual type. Said charging bells may be operated by any preferred mechanism, suitable mechanism for the purpose being diagrammatically indicated in Figure 1. Mechanism for operating the small bell is indicated by the numeral 1a, and mechanism for operating the large bell is indicated by the numeral 2a. Mounted within the blast furnace A is the test rod 3, which test rod is guided for straight line movement within the sleeve 3a, whereby said test rod always occupies a vertical position. Said test rod 3 is preferably provided with a shoe 3b adapted to contact with the charge within the blast furnace and to prevent the sinking of said test rod 3 into said charge. Said test rod is controlled by means of the cable or flexible connector 4 disposed upon the sheaves 5—5. Said cable 4 is connected to the winding drum 6, which may be grooved if preferred. An electric motor 7 is provided for turning the drum 6, a pinion 8 being disposed upon the motor shaft adapted to engage with the gear 9a coaxially mounted with the winding drum 6. The shaft of the electric motor 7 is provided with the brake wheel 9, which brake wheel is controlled by the brake shoes 10—10, which shoes are normally biased to braking position. A brake coil 11 is provided, which when energized is adapted to hold the brake shoes 10—10 out of braking relationship with the brake wheel 9. Driven synchronously with the winding drum 6 is the flexible shaft 12 adapted to drive the worm 13. Said worm 13 engages the worm wheel 14, which worm wheel is adapted to drive the recording meter 15. The worm wheel 14 is adapted to control the crank 16 for operating the normally closed limit switches 17a and 17b, both of which are biased to closed position. The instrumentalities above referred to are controlled electrically by means which for purposes of description may be referred to as the stock line recorder controller, which controller is indicated in Figure 1 by the numeral 19.

The numeral 20 indicates a switch or start button by means of which the stock line recorder controller 19 may be set into operation to lift the test rod 3, which operation will occur after the small bell 1 has closed, as above mentioned. The mechanism 1a for controlling the small bell 1 is connected to said bell 1 by means of the flexible cable 21, which flexible cable is disposed upon the sheaves 22—22. The mechanism for controlling the large bell 2 is connected to said bell 2 by means of the flexible cable 21a, which cable is disposed upon sheaves 22a—22a. In the illustrated embodiment of the present invention the mechanisms 1a and 2a take the form of cylinders, which may be operated by means of air, steam, oil, or other fluid. The diagrammatic sketch comprising Figure 1 is not drawn to scale, and the range of movement of cylinders 1a and 2a is shown exaggerated with reference to the range of movement of the bells 1 and 2. For purposes of consistency, each of the cables 21 and 21a is shown with a movement modifying means 21b interposed therein for the purpose of translating the movement of the cylinder 1a and 1b into the proper movement of the bells 1 and 2. Disposed within each cylinder is the relatively stationary piston 23 having the piston rod 24. Said piston 23 and piston rod 24 are provided with apertures 25 and 26, of which the aperture 25 communicates with the space above said piston and the aperture 26 communicates with the space below said piston. Said apertures 25 and 26 communicate with the pipes 27 and 28, respectively. The pipes 27 and 28 associated with cylinder 1a are controlled by the four-way valve 29. The pipes 27 and 28 associated with cylinder 2a are controlled by the four-way valve 29a. Said four-way valves 29 and 29a connect with a source of fluid supply, indicated by the numeral 30, and with the fluid discharge 30a. Said valve 29 is provided with the arm 31 adapted to be controlled by the link 31a controlled by the lever 31b adapted to be engaged by the cylinder 1a near the top of the stroke of said cylinder 1a. The operator, in order to open the small bell 1, will move the arm 31 upwardly, which will admit fluid to the region above the piston 23, raising cylinder 1a and lowering the small bell 1. When said cylinder 1a approaches the upper limit of its travel it will engage lever 31b to reverse the position of arm 31 of valve 29, causing valve 29 to admit fluid to the space below piston 23, lowering cylinder 1a and causing small bell 1 to close.

Connected to move with the small bell operating cylinder 1a is the abutment 31c adapted at the lower limit of movement of said cylinder 1a to close the normally open limit switch 31d and, at a region intermediate of the range of travel of said cylinder 1a, to close the normally open limit switch 31e. Said valve 29a is provided with the arm 31f, which arm 31f is connected to be operated in response to the cable 4 through instrumentalities which will now be briefly described.

Mounted in encircling relationship with the cable 4 is the stirrup 32, adapted to be engaged by an abutment 33 adjustably secured to said cable 4 above said stirrup 32. Said stirrup has connected thereto flexible cables 34—34, which are disposed upon sheaves 35—35 and connect with the cross bar 36, which cross bar 36 is secured to the arm 31f of the control valve 29a. Said cross bar 36 is provided with the counterweight 37 biasing said cross bar in a downward direction and consequently biasing the stirrup 32 upwardly. Said counterweight 37 is adapted to rest upon the fixed abutment 38.

Disposed upon the operating mechanism 2a is an abutment 39 adapted to contact with a limit switch 40 when said operating mechanism 2a is at the limit of its upward movement, that is to say—when the charging bell 2 is in its full open position.

Figure 2:
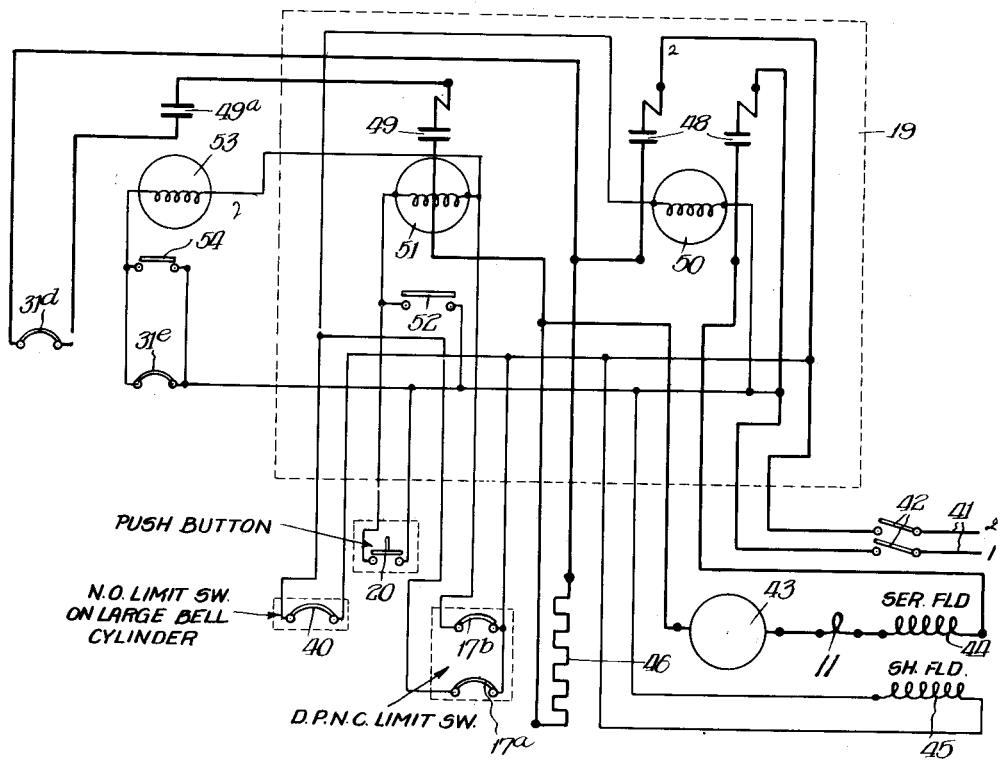
Figure 2 is a view illustrating the electrical connections which may be utilized in connection with the apparatus shown in Figure 1.
Figure 3:
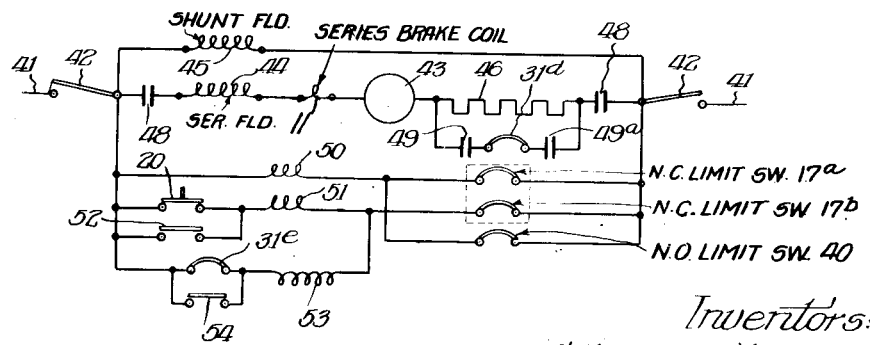
Figure 3 is a wiring diagram showing the electrical connections of Figure 2 in more compact form and omitting the showing of details of certain of the instrumentalities shown in Figure 2.

Figures 2 and 3 show the electrical connections of the mechanism shown in Figure 1. The numerals 41—41 indicate the two sides of an electric circuit, which circuit may be controlled by the blades 42—42 of a double pole switch. The electric motor 7 comprises the armature 43, the series field winding 44 and the shunt field winding 45, said armature and series field winding being connected in series with the resistance 46 (which resistance functions under predetermined conditions to limit the torque of the motor 7) and with the series brake coil 11 across the conductors 41—41 through the double pole contactor 48—48, which is biased to open position. Bridged across the resistor 46 is the contactor 49, normally open limit switch 31d and normally open contactor 49a. The shunt field winding 45 is connected across the conductors 41—41. Also connected across the conductors 41—41 is a circuit including the operating coil 50 of contactor 48 and the normally closed limit switch 17a cooperating with the drum 6. Paralleling the normally closed limit switch 17a is a circuit including the normally open limit switch 40 cooperating with the operating cylinder 2a. Also connected across the conductors 41—41 is a circuit including the start button 20, the operating coil 51 of contactor 49, and the normally closed limit switch 17b. Paralleling the start button 20 and movable with contactor 49 is the normally open auxiliary contact 52 connected to move in unison with contactor 49. Said auxiliary contact 52 is adapted to open when contactor 49 opens and to close when contactor 49 closes. Bridged across the circuit of start button 20 and coil 51 is a circuit including the normally open limit switch 31e (cooperating with cylinder 1a) and the operating coil 53 of the contactor 49a. Bridged across the normally open limit switch 31e is the normally open auxiliary contact 54, which is actuated in unison with contactor 49a. The normally closed limit switches 17a and 17b cooperating with the winding drum 6 are adapted to be opened when the test rod 3 is at the upper limit of its travel. Normally open limit switch 40 is adapted to be closed when the operating cylinder 2a is at the upper limit of its travel, that is to say—when the charging bell 2 is in its full open position.

A typical cycle of operation is as follows: For the purpose of this description a cycle will be assumed as beginning with the test rod resting upon the charge in the furnace or other receptacle. Under this condition the normally open contactor 48—48 will have been closed by means of a circuit completed through the coil 50 of said contactor 48. Said circuit may be traced as follows: From line 41, through switch 42, coil 50, normally closed limit switch 17a and switch 42 to the other line 41. It will be noted from an inspection of Figure 3 that the circuit of the operating coil 50 for contactor 48 includes the normally closed limit switch 17a. At this time, that is—with contactor 48 closed, the circuit of the motor 7 is completed across the conductors 41—41. By reference to Figure 3 it will be noted that the circuit of said motor 7 includes the series field winding 44, the armature 43 and the resistor 46, as well as the contactor 48—48, which is closed at this time. It will be noted that the shunt field winding 45 is in circuit at all times when the switch blades 42—42 are closed. Under these conditions, with the resistor 46 in circuit, a torque will be developed by the motor 7 sufficient to hold taut the cable 4, but insufficient to lift the test rod 3. If for any reason the burden within the blast furnace should rise, the test rod 3 will rise, the cable 4 will be reeled up and the corresponding movement of the drum 6 will be indicated through the flexible shaft 12, worm 13, worm wheel 14 and recording meter 15. Should the burden fall, the test rod 3 will descend, causing the cable 4 to be reeled off the winding drum 6, giving a corresponding indication on the recording meter 15.

The operator may dump the small bell 1 by raising the arm 31 (see Fig. 1) which controls the four-way valve 29 to admit fluid from the source 30 to the space above the piston 23 in the cylinder 1a, causing the lifting of said cylinder 1a and the lowering of the small bell 1. When the cylinder 1a has reached the top of its stroke, it will move lever 31b, which through link 31a will move arm 31 to its original position, permitting access from the space above piston 23 in cylinder 1a to the discharge 30a and admitting fluid from the source 30 to the space below piston 23, thereby causing cylinder 1a to descend and small bell 1 to close in a safe manner. When the operator is ready to dump the small bell 1 for the last time prior to a dump of the large bell (or at any time after the next to the last dump of said small bell), he may, by operating the start button 20, inaugurate a cycle of automatic operation of the test rod 3 and the large bell 2, which cycle will commence while said small bell 1 is opening.

Assuming that the operator has moved the arm 31 upwardly to start upward movement of the cylinder 1a (i. e. opening movement of small bell 1) and that he has operated the start button 20, circuit is completed from the left-hand conductor 41 (Fig. 3) through coil 51 of contactor 49), through limit switch 17b, to the right-hand conductor 41. Energization of coil 51 closes contactor 49 and said contactor 49 is held closed after pressure is released from start button 20, by reason of the sustaining circuit through auxiliary contact 52 moving in unison with contactor 49. After cylinder 1a has moved upwardly a short distance, the abutment 31c engages normally open limit switch 31e, closing same, which closes a circuit from left-hand conductor 41, through limit switch 31e, through operating coil 53 of contactor 49a, through limit switch 17b to right-hand conductor 41. Energization of coil 53 closes contactor 49a and contact 54 (inasmuch as contact 54 moves in unison with contactor 49a). Closure of contact 54 completes a maintaining circuit for coil 53 around limit switch 31e. The cylinder 1a will proceed to the top of its stroke and will be automatically returned by reason of the engagement with lever 31b, as above described, resulting in the full opening and closing of the small bell 1.

It may be noted at this time that if the operator had not closed the start switch 20 until some time during the down stroke of cylinder 1a, nevertheless limit switch 31e would be closed on the down stroke of cylinder 1a, producing the functions described above in connection with the up stroke of cylinder 1a. When the small bell 1 has closed, limit switch 31d is closed by abutment 31c, thereby completing a circuit across resistor 46, which circuit comprises contactor 49, limit switch 31d and contactor 49a, resulting in an increase in the torque of the motor 7 sufficient to raise the test rod 3. When said test rod reaches its upper limit of travel, normally closed limit switches 17a and 17b will be opened by reason of engagement of the crank 16 with said switches, deenergizing operating coil 50 of contactor 48, the operating coil 51 of contactor 49 and the operating coil 53 of contactor 49a, stopping the motor 7. Opening of contactor 48 deenergizes the coil 11 and sets the brake shoes 10—10. However, a short distance before said test rod 3 has reached its upper limit of travel, the abutment 33 secured to the cable 4 has engaged the stirrup 32 connected to the cables 34—34. During the final portion of the movement of said cable 4 is lifting the test rod 3, said abutment 33 will exert a downward pressure upon the stirrup 32 in opposition to the counterweight 37. This movement will lift the cross bar 36, resulting in the operation of the control valve 29a to admit fluid under pressure to the space above the piston 23 of cylinder 2a, which results in the raising of the cylinder 2a and the lowering of the large bell 2. When the operating cylinder 2a has reached the limit of its movement in an upward direction, that is—when the large bell 2 is in its full open position, the abutment 39 of said cylinder 2a will engage the normally open limit switch 40 to close same, completing a circuit from one conductor 41, through the operating coil 50 of contactor 48, through said limit switch 40, to the other conductor 41. Closure of the contactor 48 results in the releasing of the brake shoes 10—10 and the energization of the motor 7, which energization, however, is limited by the resistor 46, which is in circuit at this time. The motor 7 is therefore permitted to exert only a limited torque, insufficient to present the descent of the test rod 3. The test rod 3 is therefore permitted to descend slowly. After said test rod has descended a short distance, limit switches 17a and 17b will be permitted to close by reason of the fact that crank 16 becomes disengaged therefrom. Inasmuch as limit switch 17a is in parallel with the normally open limit switch 40, circuit of the operating coil 50 of contactor 48 is transferred from the limit switch 40 to the limit switch 17a. Limit switch 17b has no effect at this time because auxiliary contact 52 and push button 20 are open at this time. After the test rod 3 has descended a little further, the abutment 33 will be lifted, releasing pressure on the stirrup 32, allowing said stirrup 32 to rise under the influence of the counterweight 37, which action is accompanied by the descent of the cross bar 36. By reason of this action the operating arm 31f will be moved in a clockwise direction as the parts are viewed in Figure 1 to move the control valve 29a to admit fluid to the cylinder 2a below the piston 23, causing the descent of the cylinder 2a and closing the large bell 2. Simultaneously with the closing of the large bell 2, the test rod 3 continues to descend to the burden within the blast furnace in a safe manner. When said test rod has reached the burden, the shoe 3b thereof will contact with said burden and will prevent said test rod from sinking into said burden. Thereafter, until the push button 20 is operated to again haul up the test rod 3, said test rod 3 will rise and descend with the rise and fall of the burden within the blast furnace, the cable 4 being held taut at all times in the manner above explained; changes in position of the test rod 3 being indicated upon the meter 15 and any other indicating devices connected to operate in unison with the drum 6.

The present invention has the decided advantage that the test rod may be maintained in operative relationship with the burden throughout practically all of the period of operation of the blast furnace, the time during which the test rod is out of bearing relationship with the burden being only that time elapsing from the closure of the small bell 1 prior to a dump of the large bell 2, to the start of the closing movement of the large bell 2 at the end of each charging operation thereof. It is not necessary according to the present invention to wait until the large bell is in closed position before permitting the test rod 3 to descend to the burden, the interval of time required for the closing of the large bell after each charging operation thereof being saved. A greater and more important advantage accrues from the fact that the scale car operator may, in addition to his regular duties, perform the duties of the skip operator, it being necessary for the scale car operator to remain in proximity to the skip mechanism only long enough to inaugurate operation of the small bell by moving the arm 31 and at predetermined intervals operating the start button 20.

The present invention has been described in connection with blast furnaces, but it is, of course, also applicable to receptacles in general having closures similar in function to the bell or bells described herein.

Though a preferred embodiment of the present invention has been described in detail, many modifications will occur to those skilled in the art. It is intended to cover all such modifications that fall within the scope of the appended claims.

What is claimed is:

1. In a blast furnace charging system, in combination, a receptacle the level of the contents of which is to be indicated, a test member responsive to gravity adapted to rest for prolonged periods of time upon the top of said contents, an electric motor for raising said test member, a cable connected to said test member adapted to be wound up by said motor, electrical connections including torque limiting means for said motor for causing said motor to exert a force upon said cable at all times when said test member is resting upon said contents, a closure member, gravity responsive means tending to hold said closure member in closed position and control means for said gravity responsive means for causing the opening of said closure member, said control means being responsive to movement of said test member.

2. In combination, a receptacle the level of the contents of which is to be indicated, a test member responsive to gravity adapted to rest for prolonged periods of time upon the top of said contents, a cable connected to said test member, an electric motor, control means for said motor for causing said motor to exert under predetermined conditions a continuous pull upon said cable sufficient to hold said cable taut but insufficient to raise said test member, a closure for said receptacle, weighted means tending to hold said closure in closed position, and control means for said weighted means, said control means for said weighted means being responsive to an upper position of said test member for causing said weighted means to permit the opening of said closure, said control means for said motor including means for holding said test member in a predetermined position while said closure is open.

3. In a charging system, in combination, a receptacle, a test member responsive to gravity adapted to rest upon the contents within said receptacle, a cable for lifting said test member, said cable being provided with an abutment movable therewith, a closure for said receptacle and motive means for controlling the opening and closing movements of said closure, control means for said motive means, said abutment being adapted to have engaging relationship with said control means whereby to cause operation of said motive means at a predetermined elevated region within the range of movement of said test member.

4. In a charging system, in combination, a receptacle, a test member responsive to gravity, a pair of closures disposed in series with one another, means for lifting said test member, motive means cooperatively associated with each of said closures for controlling the opening and closing movements of said closures, manually operable control means for said motive means cooperatively associated with one of said closures, and means responsive to the lifting means for said test member for controlling the motive means for the other of said closures.

5. In a charging system, in combination, a receptacle, a test member responsive to gravity adapted to rest upon the top of the contents within said receptacle, lifting means for said test member, a first closure and a second closure in series with each other, motive means for said first closure, motive means for said second closure, manually controlled means for the motive means for said first closure for causing an opening movement and a subsequent closing movement of said first closure, said motive means for said first closure being adapted to cooperate with said manual control means for causing a closing movement of said first closure, and means movable with said lifting means for controlling the motive means for said second closure for causing the opening movement of said second closure, said motive means for said second closure being provided with means for causing the closing movement of said second closure.

6. In a charging system, in combination, a receptacle, a test member responsive to gravity adapted to rest upon the top of the contents within said receptacle, lifting means for said test member, a first closure and a second closure in series with each other, motive means for said first closure, motive means for said second closure, manually controlled means for the motive means for said first closure for causing an opening movement and a subsequent closing movement of said first closure, said motive means for said first closure being adapted to cooperate with said manual control means for causing a closing movement of said first closure, and means movable with said lifting means for controlling the motive means for said second closure for causing the opening movement of said second closure, said motive means for said second closure being provided with means for causing the closing movement of said second closure, said lifting means including an electric motor and control circuits therefor including a starting switch and interlocking means between said motive means for said first closure and said control circuits adapted to energize said electric motor to lift said test member when said switch is in closed position.

7. In a blast furnace charging system, in combination, a blast furnace, a test member responsive to gravity and adapted to rest upon the charge within said blast furnace, lifting means for said test member, said lifting means including an electric motor and electrical control circuits therefor, said electrical control circuits including a switch, a small bell and a large bell, said bells being disposed in series with each other, operating means cooperating with each of said bells for controlling the opening and closing movements thereof, manual control means for the operating means associated with said small bell for inaugurating a cycle including the opening and closing movements of said small bell, means responsive to the position of said test member for controlling the operating means for said large bell to inaugurate a cycle including opening and closing movements of said large bell, and interlocking means between the operating means for said small bell and the control circuit for said motor for causing hoisting action of said motor when said switch is in closed position.

8. In a blast furnace charging system, in combination, a blast furnace, a test member responsive to gravity adapted to rest upon the top of the charge within said blast furnace, motive means including an electric motor for lifting said test member, a small bell, operating means therefor, a large bell in series with said small bell, operating means therefor, manual control means cooperatively associated with the motive means for said small bell for inaugurating a cycle including an opening movement and a closing movement of said small bell, control means for the operating means for said large bell, said last mentioned control means being responsive to the position of said test member, control means for said electric motor, and interlocking means between said operating means for said small bell and said electric control means for said motor for insuring that said electric motor may not lift said test member until said small bell is closed.

9. In a blast furnace charging system, in combination, a blast furnace, a small bell, a large bell, said bells being in series with each other, operating mechanism for controlling the opening and closing movements of said small bell, operating mechanism for controlling the opening and closing movements of said large bell, electric motive mechanism including an electric motor for predetermining the operativeness of the operating mechanism for said large bell, a test rod responsive to gravity adapted to be lifted by said electric motive mechanism, and interlocking connections between the motive mechanism for said small bell and said electric motive mechanism for preventing the actuation of said large bell until said small bell is in closed position.

Signed at Chicago, Illinois, this 4th day of March, 1929.

ARTHUR J. WHITCOMB.
OWEN R. RICE.
OLAF C. CALLOW.